UNITED STATES PATENT OFFICE 2,692,266

1 - (DIALKYLAMINOALKYL) - 1,2 - DIHYDRO-2,2,4-TRIMETHYLQUINOLINES AND SALTS THEREOF

Ferdinand C. Meyer, Kirkwood, Mo., assignor to Monsanto Chemical Company, St. Louis, Mo., a corporation of Delaware No Drawing. Application October 11, 1951,
Serial No. 250,955

13 Claims. (Cl. 260—288)

This invention relates to new and useful compositions of matter. More particularly it relates to 1 - (dialkylaminoalkyl) - 1,2 - dihydro - 2,2,4-trimethylquinolines of the general formula

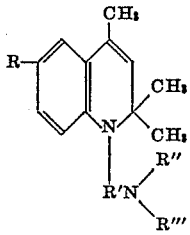

where R is hydrogen, a hydrocarbon group, an alkoxy group, or a halogen atom, where R' is an alkylene radical such as ethylene, propylene, etc., where R'' and R''' are like or unlike lower alkyl radicals such as methyl, ethyl, propyl, isopropyl, etc., and salts thereof with acids.

The new compositions are characterized by physiological properties and are effective against histamine-induced allergic reactions. The new compositions, particularly the free bases, are also useful as activators of rubber vulcanization accelerators.

The new compositions are prepared by alkylating a suitable 1,2-dihydro-2,2,4-trimethylquinoline with a 2-haloalkyl-dialkylamine and as illustrative thereof the following is given:

*Example 1*

To a suitable reaction vessel containing a slurry of 12.8 parts by weight (substantially 0.5 mol) of lithium amide in approximately 217 parts by weight of toluene is added with agitation 86.6 parts by weight (substantially 0.5 mol) of 1,2-dihydro - 2,2,4 - trimethylquinoline. The mixture is then heated and maintained at reflux temperature for about 6 hours. The mix is cooled and thereto is slowly added a solution containing 53.8 parts by weight (substantially 0.5 mol) of 2-chloroethyl-dimethylamine in approximately 173 parts by weight of toluene. Thereupon the mixture is heated at about 80° C. for about three hours. Upon cooling to about 30° C. and quenching with water, the water-immiscible organic layer is decanted and the toluene stripped off. Thereafter the residue is subjected to vacuum fractionation and approximately a 79% yield of a light brown oil having a boiling point of 175-180° C./12 mm. identified as 1-(2-dimethylaminoethyl) - 1,2 - dihydro - 2,2,4 - trimethylquinoline is obtained.

The mono-hydrochloride of 1-(2-dimethylaminoethyl) - 1,2 - dihydro - 2,2,4 - trimethylquinoline is a fluffy white crystalline material having a melting point of 179.5–180° C.

*Example 2*

Employing the procedure of Example 1 but replacing 1,2 - dihydro - 2,2,4 - trimethylquinoline with an equimolecular amount of 1,2-dihydro-2,2,4-trimethyl-6-phenylquinoline a good yield of a high boiling oil identified as 1-(2-dimethylaminoethyl) - 1,2 - dihydro - 2,2,4 - trimethyl-6-phenylquinoline is obtained.

The mono-hydrochloride is prepared by dissolving the 1 - (2 - dimethylaminoethyl) - 1,2-dihydro-2,2,4-trimethyl-6-phenylquinoline in a mixture of diisopropyl ether and isopropyl alcohol, treating the solution with an equimolecular amount of hydrogen chloride, heating the mix so treated, cooling the mix to about 0° C., and separating the crystalline hydrochloride salt.

*Example 3*

Employing the procedure of Example 1 but replacing 1,2 - dihydro - 2,2,4 - trimethylquinoline with an equimolecular amount of 1,2-dihydro-2,2,4-trimethyl-6-ethoxyquinoline a good yield of a high boiling oil identified as 1-(2-dimethylaminoethyl) - 1,2 - dihydro - 2,2,4 - trimethyl-6-ethoxyquinoline is obtained.

*Example 4*

Employing the procedure of Example 1 but replacing 1,2 - dihydro - 2,2,4 - trimethylquinoline with an equimolecular amount of 1,2-dihydro-2,2,4,6-tetramethylquinoline a good yield of a high boiling oil identified as 1-(2-dimethylaminoethyl)-1,2-dihydro-2,2,4,6-tetramethylquinoline is obtained.

*Example 5*

Employing the procedure of Example 1 but replacing 1,2-dihydro-2,2,4-trimethylquinoline with an equimolecular amount of 1,2-dihydro-2,2,4-trimethyl-6-chloroquinoline and 2-chloroethyl-dimethylamine with an equimolecular amount of 2-bromoethyldiethylamine a good yield of a high boiling oil identified as 1-(2-diethylaminoethyl) -1,2- dihydro -2,2,4- trimethyl -6- chloroquinoline is obtained.

*Example 6*

Employing the procedure of Example 1 but replacing 2-chloroethyldimethylamine with an equimolecular amount of 3-bromopropyldiethylamine a good yield of a high boiling oil identified as 1-(3-diethylaminopropyl)-1,2-dihydro-2,2,4-trimethylquinoline is obtained.

The mono-hydrobromide is prepared by dissolving the 1-(3-diethylaminopropyl)-1,2-dihydro-2,2,4-trimethylquinoline in a mixture of diisopropylether and isopropyl alcohol, treating the solution with an equimolecular amount of hydrogen bromide, heating the mix so treated, cooling the mix to about 0° C. and separating the crystalline hydrobromide salt. The di-hydrobromide is prepared in a similar fashion but using twice as much hydrogen bromide.

*Example 7*

Employing the procedure of Example 1 but replacing 1,2-dihydro-2,2,4-trimethylquinoline with an equimolecular amount of 1,2-dihydro-2,2,4-trimethyl-6-isopropylquinoline a good yield of high boiling oil identified as 1-(2-dimethylaminoethyl)-1,2-dihydro-2,2,4-trimethyl-6-isopropylquinoline is obtained.

The mono-ascorbic acid salt is prepared by dissolving the 1-(2-dimethylaminoethyl)-1,2-dihydro-2,2,4-trimethyl-6-isopropylquinoline in a mixture of diisopropylether and isopropyl alcohol, adding thereto with agitation an equimolecular amount of ascorbic acid, warming the mixture, cooling the mix to about 0° C. and separating the ascorbic acid salt.

As illustrative of other new compounds of this invention are:

1-(4-dimethylaminobutyl)-1,2-dihydro-2,2,4,6-tetramethylquinoline
1-(3-dimethylaminopropyl)-1,2-dihydro-2,2,4-trimethyl-6-cyclohexylquinoline
1-(2-dimethylaminoethyl)-1,2-dihydro-2,2,4-trimethyl-6-n-amylquinoline
1-(2-dimethylaminoethyl)-1,2-dihydro-2,2,4-trimethyl-6-(2-ethylhexyl)-quinoline
1-(2-dimethylaminoethyl)-1,2-dihydro-2,2,4-trimethyl-6-benzylquinoline
1-(2-dimethylaminoethyl)-1,2-dihydro-2,2,4-trimethyl-6-(p-tolyl)-quinoline
1-(2-dimethylaminoethyl)-1,2-dihydro-2,2,4-trimethyl-6-methoxyquinoline
1-(5-dimethylaminoamyl)-1,2-dihydro-2,2,4-trimethyl-6-bromoquinoline
1-(2-dimethylaminoethyl)-1,2-dihydro-2,2,4-trimethyl-6-iodoquinoline and acid salts thereof.

The compounds of this invention may be employed as therapeutic agents, e. g. antihistamines or antispasmodics, either in the form of free bases or in the form of salts thereof with an inorganic acid, such as hydrochloric acid, hydrobromic acid, sulfuric acid, or phosphoric acid or with organic acids such as oxalic acid, salicyclic acid, tartaric acid, maleic acid, fumaric acid, succinic acid, citric acid, lactic acid, gluconic acid or ascorbic acid. The new compounds may be adminstered for therapeutic purposes either in the form of tablets, creams or injection solutions.

Although the manner of alkylation of the 1,2-dihydro-2,2,4-trimethylquinoline has been described in reference to the usage of lithium amide, other metal amides such as sodium amide, potassium amide and the like may be used. However, it is to be understood that it is not necessary to employ a metal amide to assist in the alkylation, although it is preferred, but that the haloalkyldialkylamine may be reacted directly with the particular 1,2-dihydro-2,2,4-trimethylquinoline to form the alkylated product.

For example, good yields of the new compounds are obtained by reacting equimolecular amounts of the respective reagents in the presence of an alkali metal carbonate, in the absence of water and in the presence of a suitable organic solvent. The new compounds may also be prepared by reacting the respective reagents in a molar ratio of 2 of an 1,2-dihydro-2,2,4-trimethylquinoline to 1 of haloalkyldialkylamine, and separating the resultant hydrohalide salt and free base.

What is claimed is:

1. A compound of the group consisting of a free base and acid salts thereof, said free base having the formula

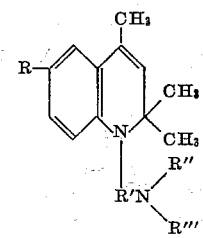

where R is selected from the group consisting of hydrogen, hydrocarbon radicals containing not more than eight carbon atoms, lower alkoxy radicals and halogen atoms, where R' is an alkylene radical containing not more than five carbon atoms, where R'' and R''' are lower alkyl radicals.

2. A compound of the formula

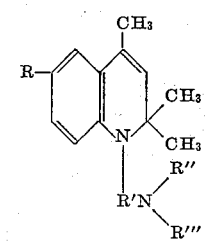

where R is a hydrocarbon radical containing not more than eight carbon atoms, where R' is an alkylene radical containing not more than five carbon atoms, and where R'' and R''' are lower alkyl radicals.

3. A compound of the formula

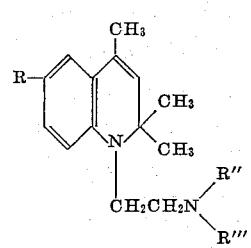

where R is an alkyl radical containing not more than eight carbon atoms, and where R'' and R''' are lower alkyl radicals.

4. A compound of the formula

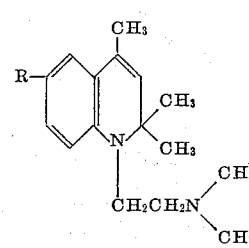

where R is an alkyl hydrocarbon radical containing not more than eight carbon atoms.

5. A compound of the formula

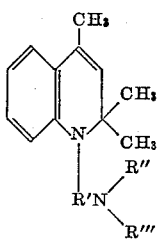

where R' is an alkylene radical containing not more than five carbon atoms, and where R" and R'" are lower alkyl radicals.

6. A compound of the formula

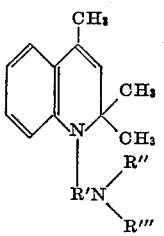

where R' is an ethylene radical, and where R" and R'" are lower alkyl radicals.

7. As a new compound 1-(2-dimethylaminoethyl)-1,2-dihydro-2,2,4-trimethylquinoline.

8. As a new compound 1-(2-dimethylaminoethyl) - 1,2 - dihydro-2,2,4-trimethyl-6-chloroquinoline.

9. As a new compound 1-(2-dimethylaminoethyl) - 1,2 - dihydro-2,2,4-trimethyl-6-phenylquinoline.

10. In the method of making the composition of claim 1 the step which comprises reacting a haloalkyl di-(lower alkyl) amine wherein the alkylene radical of the haloalkyl substituent contains not more than five carbon atoms with an 1,2-dihydro-2,2,4-trimethylquinoline having a substituent in the 6-position selected from the group consisting of hydrogen, hydrocarbon radicals containing not more than eight carbon atoms, lower alkoxy radicals and halogen atoms.

11. In the method of making the composition of claim 1 the step which comprises reacting a haloalkyl di-(lower alkyl) amine wherein the alkylene radical of the haloalkyl substituent contains not more than five carbon atoms with an 1,2-dihydro-2,2,4-trimethylquinoline having a substituent in the 6-position selected from the group consisting of hydrogen, hydrocarbon radicals containing not more than eight carbon atoms, lower alkoxy radicals and halogen atoms in the presence of lithium amide.

12. In the method of making the composition of claim 4 the step which comprises reacting 2-haloethyl dimethylamine with an 1,2-dihydro-2,2,4-trimethyl-6-hydrocarbon substituted quinoline wherein the 6-hydrocarbon substituent is an alkyl radical containing not more than eight carbon atoms, in the presence of lithium amide.

13. In the method of making the composition of claim 7 the step which comprises reacting 2-chloroethyl dimethylamine with 1,2-dihydro-2,2,4-trimethylquinoline in the presence of lithium amide.

References Cited in the file of this patent

UNITED STATES PATENTS

| Number | Name | Date |
|---|---|---|
| 2,400,500 | Gibbs | May 21, 1946 |

FOREIGN PATENTS

| Number | Country | Date |
|---|---|---|
| 162,375 | Switzerland | Sept. 1, 1933 |
| 608,208 | Great Britain | Sept. 10, 1948 |

OTHER REFERENCES

Idson: Chem. Reviews, vol. 47, pp. 500–503 (1950).

Viaud: Produits Pharmaceutiques, vol. 2, No. 2, pp. 53–64 (1947).

Fieser et al.: "Organic Chemistry" (D. C. Heath and Co.; Boston, 1944), page 32.